(12) United States Patent
Huang

(10) Patent No.: US 8,628,825 B2
(45) Date of Patent: Jan. 14, 2014

(54) COMPOSITION FOR TREATING HARD SURFACE AND USE THEREOF, COATING FORMED THEREBY AND HARD SURFACE MATERIAL WITH THE COATING

(76) Inventor: Dingzhong Huang, Guangdong (CN)

( * ) Notice: Subject to any disclaimer, the term of this patent is extended or adjusted under 35 U.S.C. 154(b) by 569 days.

(21) Appl. No.: 12/736,562

(22) PCT Filed: Apr. 16, 2009

(86) PCT No.: PCT/CN2009/071300
§ 371 (c)(1),
(2), (4) Date: Oct. 18, 2010

(87) PCT Pub. No.: WO2009/127153
PCT Pub. Date: Oct. 22, 2009

(65) Prior Publication Data
US 2011/0045189 A1 Feb. 24, 2011

(30) Foreign Application Priority Data
Apr. 19, 2008 (CN) .......................... 2008 1 0027621

(51) Int. Cl.
*B05D 3/12* (2006.01)
(52) U.S. Cl.
USPC .......................................... 427/355; 106/600

(58) Field of Classification Search
CPC   C04B 41/009; C04B 41/5089; C04B 14/048; C04B 14/104; C04B 14/285; C04B 33/00; C09D 1/00
USPC ............. 106/286.5, 286.6, 286.7, 286.8, 600; 427/355, 427, 452, 453, 454
See application file for complete search history.

(56) References Cited

U.S. PATENT DOCUMENTS

| 6,352,581 | B1 * | 3/2002 | Murjahn et al. | 106/2 |
| 6,797,391 | B2 * | 9/2004 | Shibato et al. | 428/447 |
| 2007/0269650 | A1 * | 11/2007 | Leuninger et al. | 428/327 |

* cited by examiner

*Primary Examiner* — Alexander Weddle
(74) *Attorney, Agent, or Firm* — Novoclaims Patent Services, LLC; Mei Lin Wong

(57) ABSTRACT

A composition for treating hard surface includes (a) a liquid silica sol, wherein the solid content of SiO2 is 51%~99.9% by total solid weight of the composition, (b) a solid inorganic gel having nano-scale layered, chained, layered and chained, or framework structure, wherein the weight of which is 0.1%-49% by total weight of the composition, (c) a dispersing medium, wherein the weight of which is 1%-50% by total solid weight. A method for treating hard surface includes the steps of preparing the above-mentioned, coating the composition on the hard surface, and polishing the coated hard surface.

1 Claim, No Drawings

COMPOSITION FOR TREATING HARD SURFACE AND USE THEREOF, COATING FORMED THEREBY AND HARD SURFACE MATERIAL WITH THE COATING

BACKGROUND OF THE PRESENT INVENTION

1. Field of Invention

The present invention relates to a hard surface treatment, and more particularly to a composition for treating hard surface with hard surface material having the properties of skid-resistant, pollution-resistant, color-enhanced, gloss-enhanced and wear-resistant, wherein the present invention also relates to the use of the composition for treating the surface of a hard surface material, and relates to the coating formed by treating the surface of a hard surface material with the composition.

2. Description of Related Arts

Generally, for the untreated surfaces of ceramic tile, marble, granite and other hard surface material, the friction coefficients of their surfaces are between 0.3~0.4 when the surfaces are dry. However, if the surfaces are wetted by water, the friction coefficients thereof will be decreased to 0.2. It is very dangerous to walk on the wet surfaces of these untreated hard surface materials. Currently, there is no relative government standard or industry standard founded in China to regulate the non-skid treatment of the smooth granite and other hard solid surfaces on the ground. However, according to the US ASTM standard No. D204-99, the smooth hard surface is safe for walking on when its friction coefficient is more than 0.5, and is dangerous enough to incur the slipping, falling, and even hurting the walker when its friction coefficient is less than 0.5. It will be very slippery and dangerous for the walker to walk on the untreated surface when its friction coefficient is less than 0.3.

The Chinese patent published on Apr. 11, 2007 with the publication No. CN1944348 disclosed a method for preparing silicon dioxide anti-pollution layer of polished glazed tile surface to resolve the anti-pollution of the polished ceramic tile hard surface material. This method includes the step of forming a multiple anti-pollution coating of silicon dioxide on the surface of the polished ceramic tile and the step of treating the obtained coating with fluorine silicon organics to form a multiple coating with better anti-pollution effect. However, the multiple coatings of fluorine silicon organics usually have a small friction coefficient that it cannot provide the skid-resistance to the polished ceramic tile. Furthermore, the polymer resin in the multiple coatings decreases the hardness of the silicon dioxide to further affect the persistence of wear-resistance. In this patent, the polymer resin emulsion is added into the silica sol to improve the toughness of the coating and the ductility during the polishing, resulting that the evenness of the polished coating is improved. In the article "Polished Ceramic Tiles of 95% Chinese Ceramic Tile Companies Do Not Have Qualified Slid-resistance" published in the Industry Development on the web of Chinese Building Material Test and Certification Center, it was written that "Recently, the relative institutions made a sampling survey to the slid-resistance of the polished ceramic tiles produced by ceramic tile companies in China, and found that the polished ceramic tiles of 95% Chinese ceramic tile companies are unqualified in slid-resistance. Even some very big companies and famous are involved. In the sampling surveyed companies, the friction coefficients of the polished ceramic tiles produced are smaller than 0.4, and the smallest friction coefficient is only 0.2 . . . . Various polished ceramic tiles with unqualified slid-resistance are used in the fitments of the houses and the public institutions. That will cause a lot of dangers to the families and the society." Until now, there is no technical solution for providing the polished ceramic tiles with both anti-pollution and slid-resistance. Hence; it is desired to find out such technical solution.

The natural stone is used as a kind of building material and has light color and good gloss. In the various buildings in the cities, the beautify views created with stones could be seen everywhere. And the stones are gradually used in the houses. It could be seen that the stone industry has much development space. However, the pollution and pathological changes of the stones is a major problem. According to the research to the buildings in Qingdao City with outside walls decorated with stones, although these buildings are only used for about three months to half a year, more than 80% buildings already have the stone pathological changes in deferent degrees. Currently, the newest production for protecting stones is a kind of penetrable fluorine silicon organics, which could resolve the pollution-resistance problem of the stones in some degree. However, the pollution could also enter the stones under the outside force, which causes the surface friction coefficient of the stones to be decreased without any decoration of color-enhance or gloss-enhance to the stones.

Currently, in order to protect the marble, a crystal hard surface treatment technology is used to form a mirror-smooth and high gloss layer on the surface of the marble. However, the layer does not have good wear-resistance and water-resistance. Besides, the crystal hard surface treatment needs to use strong acid materials, noxious fluorine silicate and other noxious organic agencies. Hence this technology is not environment-friendly and will make influences to the human bodies. After treated by the crystal hard surface treatment technology, the color and the gloss of the marble are not enhanced obviously.

For the surface hardness of terrazzo, the Chinese patent published on Jul. 26, 2006 with a publication No. CN2799736 disclosed a terrazzo floor with coating layer, wherein the terrazzo base is firstly coated with a wear-resistant layer of $SiO_2$ or $Al_2O_3$ and then is polished to form a surface with a hardness of 6~9 HR. However, this utility model patent does not disclose the method for coating the wear-resistant layer of $SiO_2$ or $Al_2O_3$. If such wear-resistant layer is formed with silica sol, which could be solidified under the room temperature, this wear-resistant layer will be very "crisp" that it will easily drop off under the outside force. Hence, this wear-resistant layer can not bear the strong polishing of the polish pad at all. If the wear-resistant layer is formed with aluminum sol, the aluminum sol needs to be gradually heated to 1200° C. to generate α-alumina with a hardness of 9 HR. It is very hard to produce such wear-resistant layer in the working place.

In the domestic market, the floors made of various materials are coated with skid-resistant resin to increase the friction coefficient. However, the wear-resistance of the resin is not good enough and the sticky resin will collect dust and dirt easily. Hence, the pollution on the floor is very hard to be cleaned up. When walking on the floor, the walker will feel very sticky and uncomfortable.

As mentioned above, the current technical resolutions for treating the floors made of various materials have many defects that they could only provide pollution-resistance or skid-resistance. And there in no technology for making the floor with properties of skid-resistant, pollution-resistant, color-enhanced, gloss-enhanced and to multiple functions. Long with the development of the science and technology and the improvement of the quality of life, not only the requirement of beautifying the living environment shall be satisfied, but also the safety requirement of protecting the environment and resisting the skid is desired to be satisfied.

SUMMARY OF THE PRESENT INVENTION

An object of the present invention is to provide a composition for treating hard surface to make the hard surface having properties of skid-resistant, pollution-resistant, color-enhanced, gloss-enhanced and wear-resistant.

Another object of the present invention is to provide a use of the afore-mentioned composition for treating the surface of hard surface material.

Another object of the present invention is to provide a coating formed by treating the surface of the hard surface material with the afore-mentioned composition.

Another object of the present invention is to provide a hard surface material with the afore-mentioned coating such as granite, marble, polished ceramic tile, ceramic tile, terrazzo and the like.

Accordingly, the present invention provide a composition for treating hard surface comprising:

a) a liquid silica sol, wherein the solid content of SiO2 is 50%-99.9% by total solid weight of the composition;

b) a solid inorganic gel having nano-scale layered, chained, layered and chained, or framework structure, wherein the weight of which is 0.1%~50% by total weight of the composition; and c) a dispersing medium for dispersing the solid inorganic gel and adjusting the solid components of the dispersion of the composition, wherein the weight of which is to 1%~50% by total solid weight.

One or more colloid particles of the above mentioned silicon dioxide sol are polymerized spherically to have a good penetrability.

The molecular formula of the silica sol could be expressed as $_m SiO_2 \cdot _n H_2O$.

The above mentioned solid inorganic gel is a fine chemical industry production with high added value and is a special silicate composed of silicon, magnesium, aluminum, oxygen, sodium and other inorganic elements, wherein the silicate has layered, chained, layered and chained, or framework structure. The solid inorganic gel is capable of expanding in the water and bringing useful rheological characteristic into the aquiferous environment. Hence, it is very valuable. The inorganic gels have a common characteristic that it is capable of expanding and dispersing in the water well. Hence, the inorganic gel aqueous dispersion could be used to thicken and stabilize the suspension. Preferably, the inorganic gel of the present invention is selected from the group consisted of the artificially synthesized magnesium lithium silicate, the inorganic gel of attapulgite, the inorganic gel of bentonite, and the combination thereof, wherein the mainly function of the bentonite is proved by the montmorillonite. Preferably, the inorganic gel of bentonite is selected form the group consisted of high-purity montmorillonite, lithium bentonite gel powder, inorganic gel of magnesium aluminum silicate, natural magnesium aluminum silicate, high-purity sodium montmorillonite, inorganic gel of montmorillonite, natural high-purity sodium bentonite, and the combination thereof. The inorganic gel is consisted of one or more than one of the above mentioned materials.

The above mentioned dispersing medium could be a solution with pH value of 3~11, which could be the weak acid aqueous solution prepared with commonly used acid, the weak alkali aqueous solution prepared with commonly used alkali, or the water. Preferably, the dispersing medium of the composition of the present invention is water, or soften water for better.

The composition of the present invention further comprises inorganic power materials, which could be commonly used inorganic power material in the technical field, wherein the content of the inorganic power material is 0~25% by total solid weight of the composition. Preferably, the inorganic power material is selected form the group consisted of bentonite powder, attapulgite powder, calcium carbonate powder, ball clay powder, kaoline powder, mica powder, and the combination thereof.

The composition of the present invention could be used for treating the surface of hard surface material to make the surface skid-resistant, pollution-resistant, color-enhanced, gloss-enhanced and lasting wear-resistant. The hard surface material could be granite, marble, polished ceramic tile, ceramic tile, terrazzo or metallic painted surface.

After treated by the above mentioned composition, the surface of the hard surface material has a coating formed thereon, which is skid-resistant, pollution-resistant, color-enhanced, gloss-enhanced and lasting wear-resistant.

Preferably, the material with the above mentioned coating is granite, marble, polished ceramic tile, ceramic tile or terrazzo.

As the molecule of the silica sol is attached to the surfaces of the basic material and the filter grains, along with the evaporation of the water, the intermolecular dehydration between the $_m SiO_2 \cdot _n H_2O$ particles is happened that the Si—O bounds are crosslinked to form a coating with three-dimensional reticulation structure. However, as the Si—O bound has a big rigidity, the coating will easily have the split, the micro-pore and the like formed thereon during the dehydration procedure. Hence, the utility coating could not be obtained by being polished by the high-speed polishing and the low-speed and pressurized rubbing in the current technology. Hence, usually, the silicon dioxide sol is not used alone. In the composition, the silicon dioxide nano-particulars of the silica sol in the coating on the hard surface are used to attach, enhance the hardness, resist the oil and resist skid. As the inorganic sol has nano-scaled layered, layered and chained, or the like structure, it could enhance the tractility of the silicon dioxide during the polishing procedure and provide an assistance during the coating's forming procedure, wherein the silicon dioxide is very agglutinate. Hence, the brittleness of the coating is decreased and the physics and chemical capabilities of the coating are enhanced.

In the present invention, an inorganic powder material could be added into the composition, if such inorganic powder will not affect the stability of the silica sol in the composition and the adhesion force of the coating. This inorganic powder will increase the content of the solid in the composition aqueous dispersion and reduce the cost of materials.

Compared with the current technology, the polymer resin emulsion is replaced by the inorganic gel of silica of the present invention, which is used together with silicon dioxide gel to reduce the volume unit concentration of the silanophilic of the crosslinked active group, to enhance the intensity of the coating, to reduce the brittleness of the coating, to improve the tractility of the silicon dioxide during the polishing procedure and to improve the integrality of the coating. Hence, the covering ability of the coating is improved to advance the pollution-resistant ability. And the bright coating will further make the hard surface evener and more gloss. Meanwhile, a predetermined amount of silanophilic with strong polarity is kept on the surfaces of the silicon dioxide particulars, which are disposed on the coating portion contacted the air. Hence, the hard surface has the characteristics of good skid-resistance, pollution-resistance and leasing wearing-resistance, and is color-enhanced and gloss-enhanced.

The aqueous dispersion of the composition for treating hard surface is coated onto the surface of the hard surface material, such as granite, marble, polished ceramic tile, terrazzo, metallic painted surface and the like. Then the hard surface material is polished by hand or by polishing machine. During the polishing procedure, along with the evaporation of the water, the nano-scaled layered, or layered and chained matters in the inorganic gel and the silicon dioxide nano particulars are both sedimented on the hard surface under the adhesion effect of the silicon dioxide. Thereby, the defects on the solid surface will be fixed up, such as the micropore and the little scrape, to finally form a coating with nano-thickness comprising silicon dioxide and the solid of inorganic gel. This coating makes the surface has the characteristics of good skid-resistance, pollution-resistance, color-enhanced, gloss-enhanced and leasing wearing-resistance, thereby the requirement of protecting the environment will be satisfied.

The above mentioned compositions are used to treat the hard surfaces of some materials in the experiments. These surfaces have the following effects (the friction coefficient and the pollution-resistant index are tested and certificated by the Chinese Building Material Test and Certification Center).

These and other objectives, features, and advantages of the present invention will become apparent from the following detailed description, the accompanying drawings, and the appended claims.

DETAILED DESCRIPTION OF THE PREFERRED EMBODIMENT

The present invention is detailed described in the following embodiments, in which the calculations are made based on parts by weight and percentage by weight except for other description.

Referring to Table 1, Table 2 and Table 3, the silica sol in the following embodiments can be selected from various silica sols put on the current market without specific requirements for physical and chemical index. And if a composition aqueous dispersion capable of being stored for a long time is required to be prepared, a weak alkaline silica sol capable of being stable for a long time and with a pH value ranging from 8.5 to 10.0 shall be used. And when needed, such silica sol could be prepared with various silica sols on the market. Even the silica sols prepared in the usual methods by the skilled people of this technical field could also be used to prepare the composition aqueous dispersion for treating hard surface of the present invention.

| Hard Surface Material | Friction Coefficient (Dry) | Pollution-Resistance | Change of Gloss | Ability of Being Fixed Up |
|---|---|---|---|---|
| Granite | 0.88 | 4 Grade | 30.0→103.0 | Good |
| Polished Ceramic Tile | 0.89 | 4 Grade | 55.0→80~90 | Good |
| Marble | 0.80 | 3 Grade | 20.0→90.0 | Ok |
| Terrazzo | 0.65 | 3 Grade | 40.0→86.0 | OK |
| Metallic Painted Surface | | | 90.0→100.0 | Only the small scrape could be fixed up. |
| Testing Standard or Explanation | GB/T4100-2006 Testing of Friction Coefficient, Appendix of "Ceramic Tiles" Tested and Certified by Chinese Building Material Test and Certification Center | GB/T3810.14-2006 Testing of Pollution-resistance, 14th Part of "Test Methods of Ceramic Tiles" Tested and Certified by Chinese Building Material Test and Certification Center | The samples are prepared by hand. The glossiness is tested with an incident angle of 60°. | The polishing is made by hand or by polishing machine. |

TABLE 1

Production Models of Zhejiang Yuda Chemical Industry Co. Ltd.

| Production Type | Production Model | | | | |
|---|---|---|---|---|---|
| Modified Sodium | GS-10 | GS-15 | GS-20 | GS-25 | GS-30 |
| Low Sodium | LS-10 | LS-15 | LS-20 | LS-25 | LS-30 |
| Ammonium | NS-10 | NS-15 | NS-20 | NS-25 | NS-30 |
| Neutral | ZS-20 | ZA-25 | ZS-30 | | |
| Acidic | HS-10 | HS-15 | HS-20 | HS-25 | HS-30 |
| High Concentration | CatS-40 | GS-40 | GS-35 | | |
| Fine Foundry | GS-301 | GS-302 | GS-303 | GS-304 | GS-305 |
| Period of Validity | Neutral and Acidic: 6 months | | | | |
| | Others (expect High Concentration): 2 years | | | | |

TABLE 2

Silica Sols Produced by Silica Sol Department of Shanghai Institute of Applied Physics, Chinese Academy of Sciences

| Silica Sol Type | Model and Specification |
|---|---|
| Acidic Silica Sol | NSA-20, NSA-25 |
| High Concentration Silica Sol | NS-35, NS-40, NS-50 |
| Silica Sol with Large Particles | Particle Diameter: 20~30 nm, 40~60 nm, 70~100 nm; Concentration: 20%, 30%, 40% |
| Common Sodium Type Silica Sol | NS-20, NS-25, NS-30, NS-40 |
| Neutral Silica Sol | NSM-20, NSM-25, NSM-30 |

TABLE 3

Silica Sol Productions of Qindao Hengsheng Chemical Industry Co. Ltd.

| Item | Alkaline Sodium Type | | | | Acidic Type without Stabilizing Agent | | | Typical Value | |
|---|---|---|---|---|---|---|---|---|---|
| | JN-20 | JN-25 | JN-30 | JN-40 | SW-20 | SW-25 | SW-30 | JN-30 | SW-25 |
| Content of Silicon Dioxide ($SiO_2$) | 20.0-21.0 | 25.0-26.0 | 30.0-31.0 | 40.0-41.0 | 20.0-21.0 | 25.0-26.0 | 30.0-31.0 | 30.3 | 25.6 |

TABLE 3-continued

Silica Sol Productions of Qindao Hengsheng Chemical Industry Co. Ltd.

| Item | Alkaline Sodium Type | | | | Acidic Type without Stabilizing Agent | | | Typical Value | |
|---|---|---|---|---|---|---|---|---|---|
| | JN-20 | JN-25 | JN-30 | JN-40 | SW-20 | SW-25 | SW-30 | JN-30 | SW-25 |
| (%) Content of Sodium Monoxide ($Na_2O$) | 0.30 | 0.30 | 0.30 | 0.40 | 0.04 | 0.05 | 0.06 | 0.25 | 0.04 |
| (%≤) pH Value | 8.5-10.0 | 8.5-10.0 | 8.5-10.0 | 9.0 | 10.5 | 20.-4.0 | 2.0-4.0 | 9.6 | 2.8 |
| Viscosity (25° C.) (mpa · s≤) | 5.0 | 6.0 | 7.0 | 25.0 | 5.0 | 6.0 | 7.0 | 5.4 | 3.0 |
| Density (25° C.) (g/cm$^3$) | 1.12-1.14 | 1.15-1.17 | 1.19-1.21 | 1.28-1.30 | 1.12-1.14 | 1.15-1.17 | 1.19-1.21 | 1.20 | 1.16 |
| Average Particle Diameter (nm) | 10-20 | 10-20 | 10-20 | 10-20 | 10-20 | 10-20 | 10-20 | 11 | 10 |
| Period of Validity | | | | Alkaline: 1 year Acidic: half of 1 year | | | | | |

In the following embodiments, the adopted inorganic gel component is selected from the following productions or is bought from the following manufacturing plants:

1. High-purity montmorillonite: it could be produced by Anji Rongjian Minerals Refining Plant, and the content of the purified montmorillonite is about 90-98 percents; its production is innoxious, insipid, soft, salt-resistant and acid-resistant; its dispersoid is thick, but sticky, and has well thixotropy and stability, and the colloid capability of the dispersoid is similar to the VEEGUM or MAGNABRITE colloid productions of American Vanderbilt Cooperation and Collid Cooperation.

2. Magnesium lithium silicate: it could be produced by Zhejiang Institute of Geology & Mineral Resources; the main mineral constituent of the artificially synthesized magnesium lithium silicate gel is hectorite, which is rare in the nature; just like the natural hectorite, the artificially synthesized hectorite has a tri-octahedron sandwich silicate mineral, which is a typical artificially synthesized two-dimensional nano-scale material, wherein the unit cell of the hectorite is composed of two layers of Si—O tetrahedron and one layer of Mg—(O.OH) tri-octahedron between the two layers of Si—O tetrahedron, and the grain of the hectorite has an irregular shape and sizes 0.3~2.5 μm long, 0.3~2.5 μm wide and 15~230 nm thick. There are similar products overseas, like Laponite, and there are similar productions overseas, like BENTONE LT, MA, EW, LT and AD of Vellus, MACALOID, HECTONE M, Hectorite and HECTONE H of Ringo, ATTAGEL 50 of Angus company;

3. Lithium bentonite gel powder: it could be produced by Zhejiang Changan Renheng Chemical Industry Co. Ltd.

4. Inorganic gel of magnesium aluminum silicate: it could be the SM inorganic gel production produced by Zhejiang Fenghong Clay Chemical Industry Co. Ltd.

5. Natural magnesium aluminum silicate: it could be selected from the series of Sukuang's SF inorganic gel productions produced by Sunzhou Sinoma Design & Research Institute of Non-metallic Minerals Industry Co. Ltd.; the natural magnesium aluminum silicate is a kind of white, innoxious and environment-friendly natural mineral material prepared by washing, purifying and mixing the mineral gels in the tri-octahedron mineral smectite, bi-octahedron mineral bentonite and attapulgite.

6. High-purity sodium montmorillonite: it could also be called as inorganic gel of montmorillonite and could be produced by Zhejiang Sanding Technology Co. Ltd.

7. Inorganic gel of montmorillonite: it could be produced by Xinjiang Technical Institute of Physics & Chemistry CAS.

8. Natural high-purity sodium bentonite: it could be produced by Xinjiang Tuokexun Tianshan Bentonite Manufactory.

9. ATTA inorganic gel: it is a kind of grey-white powder of magnesium aluminum silicate gel material, which is scientifically prepared mainly with attapulgite; it could be produced by Chenglin Mineral Manufactory in Mingguang of Chuzhou City of Anhui Province.

Embodiment 1

Firstly, mix 10 parts by weight of high-purity montmorillonite with 100 parts by weight of aqueous solution, i.e. water, and well disperse the montmorillonite in the water, finally add and mix 200 parts by weight of liquid silica sol into the mixture to prepare a composition, wherein the content of $SiO_2$ is 20% by weight of the liquid silica sol. And the composition has a total weight of 310 parts by weight, which includes a total solid weight of 50 parts by weight, having 20% high-purity montmorillonite and 80% $SiO_2$ by weight. The content of the solid is 16.1% by total weight of the composition.

Embodiment 2

Firstly, mix 0.1 parts by weight of magnesium lithium silicate with 5 parts by weight of aqueous solution with pH value of 4, and well disperse the magnesium lithium silicate in the aqueous solution, finally add and mix 190 parts by weight of liquid silica sol into the mixture to prepare a composition, wherein the content of $SiO_2$ is 50% by weight of the liquid silica sol. And the composition has a total weight of 195.1 parts by weight, which includes a total solid weight of 95.1 parts by weight, having 0.1% magnesium lithium silicate and 99.9% $SiO_2$ by weight. The content of the solid is 48.7% by total weight of the composition.

Embodiment 3

Firstly, mix 10 parts by weight of lithium bentonite gel powder with 80 parts by weight of aqueous solution with pH value of 9, and well disperse the lithium bentonite gel powder in the aqueous solution, finally add and mix 200 parts by weight liquid silica sol into the mixture to prepare a composition, wherein the content of $SiO_2$ is 40% by weight of the liquid silica sol. And the composition has a total weight of 290 parts by weight, which includes a total solid weight of 90 parts by weight, having 11.1% lithium bentonite gel powder and 88.9% $SiO_2$ by weight. The content of the solid is 31.0% by total weight of the composition.

Embodiment 4

Firstly, mix 20 parts by weight SMP magnesium aluminum silicate with 200 parts by weight of aqueous solution, i.e. water, and well disperse the magnesium aluminum silicate in the water, finally add and mix 100 parts by weight of liquid silica sol into the mixture to prepare a composition, wherein the content of $SiO_2$ is 25% by weight of the liquid silica sol. And the composition has a total weight of 320 parts by weight, which includes a total solid weight of 45 parts by weight, having 44.4% SMP magnesium aluminum silicate and 55.6% $SiO_2$ by weight. The content of the solid is 14.1% by total weight of the composition.

Embodiment 5

Firstly, mix 1 part by weight of magnesium lithium silicate with 100 parts by weight of aqueous solution, i.e. water, and well disperse the magnesium lithium silicate in the water, finally add and mix 5 parts by weight of liquid silica sol into the mixture to prepare a composition, wherein the content of $SiO_2$ is 20% by weight of the liquid silica sol. And the composition has a total weight of 106 parts by weight, which includes a total solid weight of 2 parts by weight, having 50% magnesium lithium silicate and 50% $SiO_2$ by weight. The content of the solid is 1.9% by total weight of the composition.

Embodiment 6

Firstly, mixing 2 parts by weight of natural magnesium aluminum silicate with 15 parts by weight of aqueous solution, i.e. water, and well disperse the magnesium aluminum silicate in the water, finally add and mix 100 parts by weight of liquid silica sol into the mixture to prepare a composition, wherein the content of $SiO_2$ is 30% by weight of the liquid silica sol. And the composition has a total weight of 117 parts by weight, which includes a total solid weight of 32 parts by weight, having 6.3% natural magnesium aluminum silicate and 93.7% $SiO_2$ by weight. The content of the solid is 27.4% by total weight of the composition.

Embodiment 7

Firstly, mix 30 parts by weight of high-purity sodium montmorillonite with 220 parts by weight of softened water, and well disperse the high-purity sodium montmorillonite in the softened water, finally add and mix 200 parts by weight liquid silica sol into the mixture to prepare a composition, wherein the content of $SiO_2$ is 40% by weight of the liquid silica sol. And the composition has a total weight of 450 parts by weight, which includes a total solid weight of 110 parts by weight, having 27.3% high-purity sodium montmorillonite and 72.7% $SiO_2$ by weight. The content of the solid is 24.4% by total weight of the composition.

Embodiment 8

Firstly, mix 15 parts by weight of inorganic gel of montmorillonite with 130 parts by weight of aqueous solution, i.e. water, and well disperse the inorganic gel of montmorillonite in the water, finally add and mix 90 parts by weight liquid silica sol into the mixture to prepare a composition, wherein the content of $SiO_2$ is 25% by weight of the liquid silica sol. And the composition has a total weight of 235 parts by weight, which includes a total solid weight of 37.5 parts by weight, having 40% inorganic gel of montmorillonite and 60% $SiO_2$ by weight. The content of the solid is 14.1% by total weight of the composition.

Embodiment 9

Firstly, mixing 40 parts by weight of natural high-purity sodium bentonite with 260 parts by weight of aqueous solution, i.e. water, and well disperse the natural high-purity sodium bentonite in the water, finally add and mix 300 parts by weight liquid silica sol into the mixture to prepare a composition, wherein the content of $SiO_2$ is 30% by weight of the liquid silica sol. And the composition has a total weight of 600 parts by weight, which includes a total solid weight of 130 parts by weight, having 30.8% natural high-purity sodium bentonite and 69.2% $SiO_2$ by weight. The content of the solid is 21.7% by total weight of the composition.

Embodiment 10

Firstly, mix 5 parts by weight of nature magnesium aluminum silicate, 5 parts by weight high-purity sodium montmorillonite with 100 parts by weight of aqueous solution, i.e. water, and well disperse the magnesium aluminum silicate and the high-purity sodium montmorillonite in the water, finally add and mix 100 parts by weight liquid silica sol into the mixture to prepare a composition, wherein the content of $SiO_2$ is 40% by weight of the liquid silica sol. And the composition has a total weight of 210 parts by weight, which includes a total solid weight of 50 parts by weight, having 10% nature magnesium aluminum silicate, 10% high-purity sodium montmorillonite and 80% $SiO_2$ by weight. The content of the solid is 23.8% by total weight of the composition.

Embodiment 11

Firstly, mix 10 parts by weight of high-purity montmorillonite, 5 parts by weight of magnesium lithium silicate, 5 parts by weight of high-purity sodium montmorillonite with 200 parts by weight of aqueous solution, i.e. water, and well disperse them in the water, finally add and mix 120 parts by weight of liquid silica sol into the mixture to prepare a composition, wherein the content of $SiO_2$ is 50% by weight of the liquid silica sol. And the composition has a total weight of 340 parts by weight, which includes a total solid weight of 80 parts by weight, having 12.5% high-purity montmorillonite, 6.25% magnesium lithium silicate, 6.25% high-purity sodium montmorillonite and 75% $SiO_2$ by weight. The content of the solid is 23.5% by total weight of the composition.

Embodiment 12

Firstly, mixing 2 parts by weight of magnesium lithium silicate with 33 parts by weight of aqueous solution, i.e. water, and well disperse the magnesium lithium silicate in the water, then add and mix 2 parts by weight of bentonite powder, finally add and mix 20 parts by weight liquid silica sol into the mixture to prepare a composition, wherein the content of $SiO_2$ is 25% by weight of the liquid silica sol. And the composition has a total weight of 57 parts by weight, which includes a total solid weight of 9 parts by weight, having 22.2% magnesium lithium silicate, 22.2 bentonite powder and 55.6% $SiO_2$ by weight. The content of the solid is 15.8% by total weight of the composition.

Embodiment 13

Firstly, mix 2 parts by weight of high-purity montmorillonite with 18 parts by weight of aqueous solution, i.e. water, and well disperse the high-purity montmorillonite in the water, then add and mix 1 part by weight of attapulgite, finally add and mix 30 parts by weight of liquid silica sol into the mixture to prepare a composition, wherein the content of $SiO_2$ is 30% by weight of the liquid silica sol. And the composition has a total weight of 51 parts by weight, which includes a total solid weight of 12 parts by weight, having 16.7% high-purity montmorillonite, 8.3% attapulgite and 75% $SiO_2$ by weight. The content of the solid is 23.5% by total weight of the composition.

Embodiment 14

Firstly, mix 4 parts by weight of SMP magnesium aluminum silicate with 40 parts by weight of aqueous solution, i.e. water, and well disperse the magnesium aluminum silicate in the water, then add and mix 6 parts by weight of calcium carbonate, finally add and mix 80 parts by weight of liquid silica sol into the mixture to prepare a composition, wherein the content of $SiO_2$ is 30% by weight of the liquid silica sol. And the composition has a total weight of 130 parts by weight, which includes a total solid weight of 34 parts by weight, having 11.8% SMP magnesium aluminum silicate, 17.6% calcium carbonate and 70.6% $SiO_2$ by weight. The content of the solid is 26.2% by total weight of the composition.

Embodiment 15

Firstly, mix 10 parts by weight of ATTA inorganic gel with 80 parts by weight of aqueous solution, i.e. water, and well disperse the ATTA inorganic gel in the water, finally add and mix 200 parts by weight of liquid silica sol into the mixture to prepare a composition, wherein the content of $SiO_2$ is 40% by weight of the liquid silica sol. And the composition has a total weight of 290 parts by weight, which includes a total solid weight of 90 parts by weight, having 11.1% ATTA inorganic gel and 88.9% $SiO_2$ by weight. The content of the solid is 31.0% by total weight of the composition.

Embodiment 16

Firstly, mix 4 parts by weight of SMP magnesium aluminum silicate with 40 parts by weight of aqueous solution, i.e. water, and well disperse the magnesium aluminum silicate in the water, then add and mix 3 parts by weight of ball clay powder and 3 parts by weight of kaoline powder, finally add and mix 80 parts by weight of liquid silica sol into the mixture to prepare a composition, wherein the content of $SiO_2$ is 30% by weight of the liquid silica sol. And the composition has a total weight of 130 parts by weight, which includes a total solid weight of 34 parts by weight, having 11.8% SMP magnesium aluminum silicate, 8.8% ball clay powder, 8.8% kaoline powder and 70.6% $SiO_2$ by weight. The content of the solid is 26.2% by total weight of the composition.

Embodiment 17

Firstly, mix 2 parts by weight of magnesium lithium silicate with 33 parts by weight of aqueous solution, i.e. water, and well disperse the magnesium lithium silicate in the water, then add and mix 2 parts by weight of mica powder, finally add and mix 20 parts by weight of liquid silica sol into the mixture to prepare a composition, wherein the content of $SiO_2$ is 25% by weight of the liquid silica sol. And the composition has a total weight of 57 parts by weight, which includes a total solid weight of 9 parts by weight, having 22.2% magnesium lithium silicate, 22.2% mica powder and 55.6% $SiO_2$ by weight. The content of the solid is 15.8% by total weight of the composition.

In the above mentioned embodiment, the compositions are prepared in existing mixing method. There is no strict limitation to the usage amount of the water, only if the water used is enough to disperse the inorganic gel therein and well mix with the added silicate gel. No matter whether the composition packaged and rested forms a semisolid gel or not, the effect will not be affected. When coating the composition, it could be diluted with water before the coating or be cut by the polish pad after the coating. Especially, if it is required to prepare a composition with little solid, less viscosity and little inorganic gel, then the inorganic gel could be directly added into the silica sol with little solid to be dispersed.

Application Embodiment 1

The surface of the granite, as an example, is cleaned to remove the original wax, oil stain and resin, until the surface could be completely wetted by water. Or the surface of the granite could be polished firstly, and then be cleaned to remove the powder left after the polishing. The surface of the granite will be evenly coated with one of the above mentioned liquid compositions without being air-dried. Then the coated surface of the granite will be polished by hand or by polishing machines. If the coated surface of the granite is dried too quickly, it could be recharged with water intermittently or continuously during the polishing to make the coating evener and to improve the glossiness.

Application Embodiment 2

The surface of the polished ceramic tile is cleaned or polished, and then will be treated in the procedures, same with those in the above mentioned embodiment.

Application Embodiment 3

The surface of the marble is cleaned or polished, and then will be treated in the procedures mentioned in the above embodiment.

Application Embodiment 4

The surface of the terrazzo is cleaned or polished, and then will be treated in the procedures mentioned in the above embodiment.

Application Embodiment 5

The surface of the ceramic tile is cleaned or polished, and then will be treated in the procedures mentioned in the above embodiment.

Application Embodiment 6

The surface of the metallic paint surface is cleaned or polished, and then will be treated in the procedures mentioned in the above embodiment.

The relative characteristics are referred to "Relationship of change in friction and chemical reactions of polished granite surface" written by Yinchang Xin, Feng Kang and Jun An and published in Journal of Chemical Industry and Engineering (China) (2007, 58 (02): 440-445), "Study Process and countermeasure in protective agent of natural stone" written by Chunming Wu and Zhen Li and published in Stone (2001, (8): 38), and "Preparation of Bentonite Inorganic Gel by Half Wet Method" written by Lu Zeng, Chunjie Yan and etc. and published in Non-Metallic Mines (2007, 30 (4): 41~42, 45).

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of treating hard surface, comprising the steps of:

(a) preparing a composition, wherein said composition comprises a liquid silica sol, wherein the solid content of $SiO_2$ is 51%~99.9% by total solid weight of said composition, at least one of a solid inorganic gel having nano-scale layered, nano-scale chained, nano-scale layered and chained, and nano-scale framework structure, wherein the weight of which is 0.1%~49% by total weight of said composition, a dispersing medium for dispersing said solid inorganic gel and adjusting solid components of a dispersion of said composition, wherein the weight of which is 1%~50% by total solid weight, wherein said dispersing medium comprises at least one of a solution with pH value of 3~11, a weak acid aqueous solution, a weak alkali aqueous solution, water, and softened water;

(b) applying and polishing said composition directly onto said hard surface such that said composition is coated onto said hard surface, thereby micropores and scrapes of said hard surface are filled and repaired by said composition and a coating with nano-thickness is formed on said hard surface, and a friction coefficient of at least 0.65 is provided through the coating, wherein said hard surface is selected from the group consisting of granite, polished ceramic tile, marble and terrazzo.

* * * * *